US012670261B2

(12) United States Patent
Payne

(10) Patent No.: US 12,670,261 B2
(45) Date of Patent: Jun. 30, 2026

(54) SECURE BOOT PARTITION FOR CLOUD COMPUTE NODES

(71) Applicant: Oracle International Corporation, Redwood Shores, CA (US)

(72) Inventor: Brian Spencer Payne, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 118 days.

(21) Appl. No.: 18/662,359

(22) Filed: May 13, 2024

(65) Prior Publication Data

US 2024/0296230 A1 Sep. 5, 2024

Related U.S. Application Data

(63) Continuation of application No. 17/684,699, filed on Mar. 2, 2022, now Pat. No. 11,989,303.

(51) Int. Cl.
*G06F 21/57* (2013.01)
*G06F 9/4401* (2018.01)
(52) U.S. Cl.
CPC .......... *G06F 21/575* (2013.01); *G06F 9/4416* (2013.01)
(58) Field of Classification Search
CPC ..... G06F 21/575; G06F 9/4406; G06F 9/4416
See application file for complete search history.

(56) References Cited

U.S. PATENT DOCUMENTS

| | | | | |
|---|---|---|---|---|
| 2003/0188176 | A1* | 10/2003 | Abbondanzio ....... | G06F 21/305 713/191 |
| 2005/0071677 | A1* | 3/2005 | Khanna ................. | H04L 9/3236 726/4 |
| 2005/0149716 | A1* | 7/2005 | Nair ...................... | G06F 9/4416 713/1 |
| 2009/0307340 | A1* | 12/2009 | Haneefa .............. | G06F 11/0709 709/222 |
| 2011/0271090 | A1* | 11/2011 | Zimmer ................ | G06F 9/4406 713/2 |

(Continued)

FOREIGN PATENT DOCUMENTS

CN 111159700 A 5/2020

*Primary Examiner* — Hyun Soo Kim
(74) *Attorney, Agent, or Firm* — Invoke

(57) ABSTRACT

The present embodiments relate to a secure boot partition for a cloud computing device of a cloud computing system. The computing device of the cloud computing system can transmit a first request for a pre-boot execution environment executable from a smart network interface card (SmartNIC). The computing device can receive the pre-boot environment executable from the SmartNIC and verify the pre-boot execution environment executable. The computing device can execute the pre-boot execution environment executable. Executing the pre-boot execution environment executable can include transmitting a second request secure boot metadata from the SmartNIC and receiving the secure boot metadata. Executing the pre-boot execution environment executable can further include mounting a boot partition, loading a boot loader obtained from the boot partition, verifying the boot loader based at least in part on the secure boot metadata, and executing the boot loader in response to verifying the boot loader.

20 Claims, 10 Drawing Sheets

100 —↘

(56)                        References Cited

U.S. PATENT DOCUMENTS

| | | | | |
|---|---|---|---|---|
| 2014/0244989 | A1* | 8/2014 | Hiltgen | G06F 9/4416 |
| | | | | 713/2 |
| 2017/0010874 | A1 | 1/2017 | Rosset et al. | |
| 2018/0165455 | A1* | 6/2018 | Liguori | G06F 21/57 |
| 2018/0204007 | A1* | 7/2018 | Rangayyan | G06F 21/575 |
| 2019/0213013 | A1* | 7/2019 | Pelner | G06F 3/0604 |
| 2019/0339988 | A1* | 11/2019 | Liu | G06F 9/4416 |
| 2021/0055937 | A1 | 2/2021 | Zhan et al. | |

* cited by examiner

400

402

RECEIVE SECURE BOOT METADATA FROM A
METADATA SERVICE

404

RECEIVE REQUEST FOR A PRE-BOOT EXECUTION
ENVIRONMENT EXECUTABLE

406

RETURN PRE-BOOT EXECUTION ENVIRONMENT
EXECUTABLE

408

RECEIVE REQUEST FOR A SECURE BOOT METADATA

410

RETURN SECURE BOOT METADATA

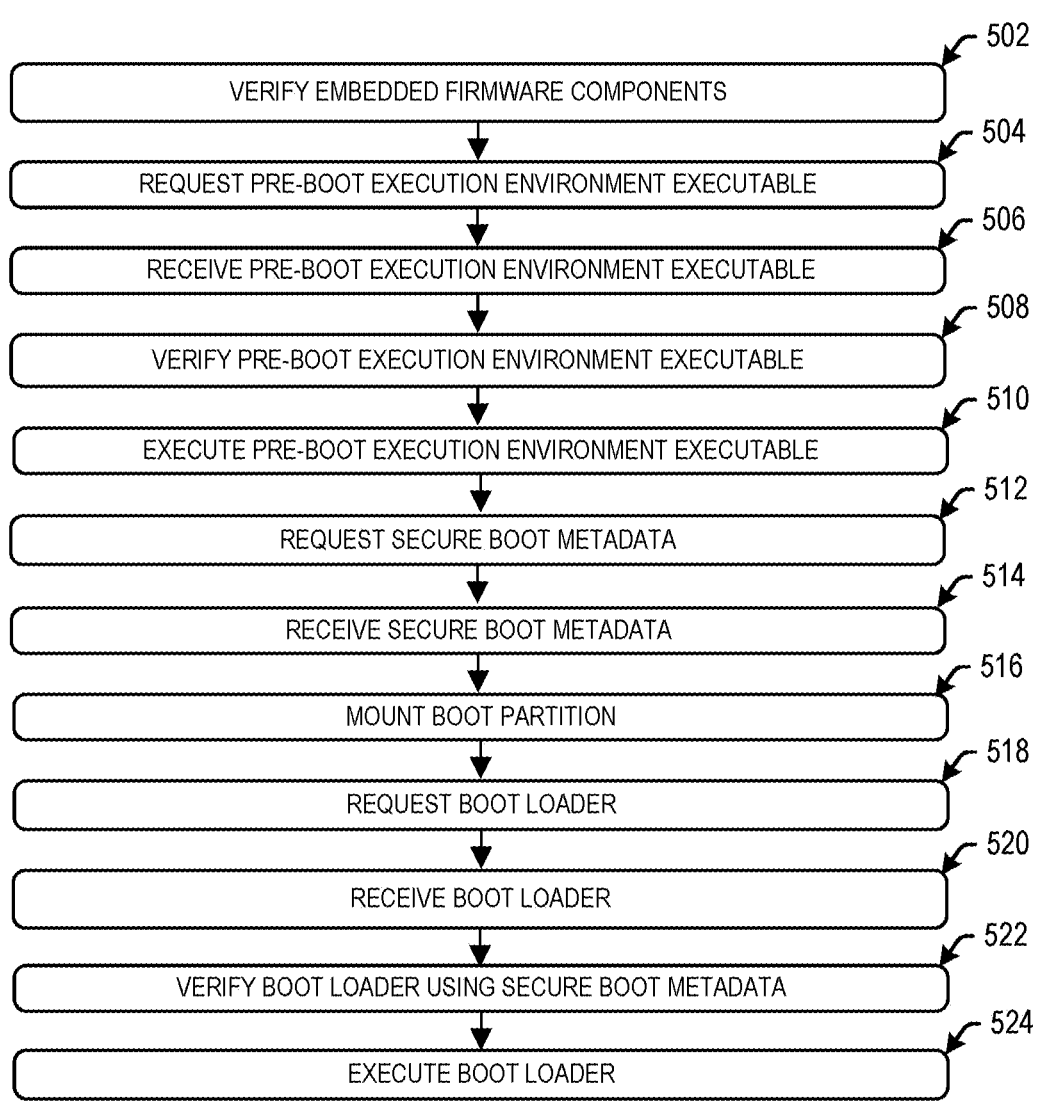

| | |
|---|---|
| VERIFY EMBEDDED FIRMWARE COMPONENTS | 502 |
| REQUEST PRE-BOOT EXECUTION ENVIRONMENT EXECUTABLE | 504 |
| RECEIVE PRE-BOOT EXECUTION ENVIRONMENT EXECUTABLE | 506 |
| VERIFY PRE-BOOT EXECUTION ENVIRONMENT EXECUTABLE | 508 |
| EXECUTE PRE-BOOT EXECUTION ENVIRONMENT EXECUTABLE | 510 |
| REQUEST SECURE BOOT METADATA | 512 |
| RECEIVE SECURE BOOT METADATA | 514 |
| MOUNT BOOT PARTITION | 516 |
| REQUEST BOOT LOADER | 518 |
| RECEIVE BOOT LOADER | 520 |
| VERIFY BOOT LOADER USING SECURE BOOT METADATA | 522 |
| EXECUTE BOOT LOADER | 524 |

*FIG. 5*

SECURE BOOT PARTITION FOR CLOUD COMPUTE NODES

INCORPORATION BY REFERENCE; DISCLAIMER

Each of the following applications are hereby incorporated by reference: application Ser. No. 17/684,699 filed on Mar. 2, 2022. The applicant hereby rescinds any disclaimer of claims scope in the parent application(s) or the prosecution history thereof and advises the USPTO that the claims in the application may be broader than any claim in the parent application(s).

BACKGROUND

A cloud computing environment enables customers to request the delivery of computing services from a shared pool of computing resources. As a customer requests a new host instances from the cloud computing environment, the environment is vulnerable while a new operating system (OS) is booted up by a cloud computing node of the cloud computing environment. Malicious actors can circumvent a computing node's security protocols by manipulating the code used to boot up the operating system. Once the manipulated code is introduced into the cloud computing environment, the code can cause harm to the environment.

BRIEF SUMMARY

The present embodiments relate to a secure boot partition for a cloud computing node. A first exemplary embodiment provides a method for performing a secure boot partition for a cloud computing node. The method can include a computing device of a cloud computing system transmitting a first request to a smart network interface card (SmartNIC). The first request requests a pre-boot execution environment executable. The SmartNIC is associated with a metadata management service that manages secure boot metadata operable for verifying a boot loader.

The method can further include the computing device receiving the pre-boot environment executable from the SmartNIC. The method can also include the computing device verifying the pre-boot execution environment executable.

The method can further include the computing device executing the pre-boot execution environment executable in response to verifying the pre-boot execution environment executable. Executing the pre-boot execution environment executable can further include transmitting a second request to the SmartNIC. The second request requests the secure boot metadata. The pre-boot execution environment executable can be configured to request the secure boot metadata from the SmartNIC. Executing the pre-boot execution environment executable can further include receiving the secure boot metadata from the SmartNIC. Executing the pre-boot execution environment executable can further include mounting a boot partition. Executing the pre-boot execution environment executable can further include loading a boot loader obtained from a boot partition. Executing the pre-boot execution environment executable can further include verifying the boot loader based at least in part on the secure boot metadata. Executing the pre-boot execution environment executable can further include executing the boot loader in response to verifying the boot loader.

A second exemplary embodiment relates to a cloud infrastructure node. The cloud infrastructure can include a processor and a non-transitory computer-readable medium. The non-transitory computer-readable medium can include instructions that, when executed by the processor, cause the processor to transmit a first request to a smart network interface card (SmartNIC). The first request requests a pre-boot execution environment executable. The SmartNIC is associated with a metadata management service that manages secure boot metadata operable for verifying a boot loader.

The instructions can further cause the processor to receive the pre-boot environment executable from the SmartNIC. The instructions can further cause the processor to device to verify the pre-boot execution environment executable.

The instructions can further cause the processor to execute the pre-boot execution environment executable in response to verifying the pre-boot execution environment executable. Executing the pre-boot execution environment executable can further include transmitting a second request to the SmartNIC. The second request requests the secure boot metadata. The pre-boot execution environment executable can be configured to request the secure boot metadata from the SmartNIC. Executing the pre-boot execution environment executable can further include receiving the secure boot metadata from the SmartNIC. Executing the pre-boot execution environment executable can further include mounting a boot partition. Executing the pre-boot execution environment executable can further include loading a boot loader obtained from a boot partition. Executing the pre-boot execution environment executable can further include verifying the boot loader based at least in part on the secure boot metadata. Executing the pre-boot execution environment executable can further include executing the boot loader in response to verifying the boot loader.

A third exemplary embodiment relates to a non-transitory computer-readable medium. The non-transitory computer-readable medium can include stored thereon a sequence of instructions, which when executed by a processor cause the processor to execute a process. The process can include transmitting a first request to a smart network interface card (SmartNIC). The first request requests a pre-boot execution environment executable. The SmartNIC is associated with a metadata management service that manages secure boot metadata operable for verifying a boot loader.

The process can also include receiving the pre-boot environment executable from the SmartNIC. The process can further include verifying the pre-boot execution environment executable.

The process can further include executing the pre-boot execution environment executable in response to verifying the pre-boot execution environment executable. Executing the pre-boot execution environment executable can further include transmitting a second request to the SmartNIC. The second request requests the secure boot metadata. The pre-boot execution environment executable can be configured to request the secure boot metadata from the SmartNIC. Executing the pre-boot execution environment executable can further include receiving the secure boot metadata from the SmartNIC. Executing the pre-boot execution environment executable can further include mounting a boot partition. Executing the pre-boot execution environment executable can further include loading a boot loader that is obtained from a boot partition. Executing the pre-boot execution environment executable can further include verifying the boot loader based at least in part on the secure boot metadata. Executing the pre-boot execution environment executable can further include executing the boot loader in response to verifying the boot loader.

BRIEF DESCRIPTION OF THE DRAWINGS

FIG. 5 is a block diagram illustrating an exemplary method performed by a host node for performing a secure boot partition, according to at least one embodiment.

DETAILED DESCRIPTION

Figure 1:
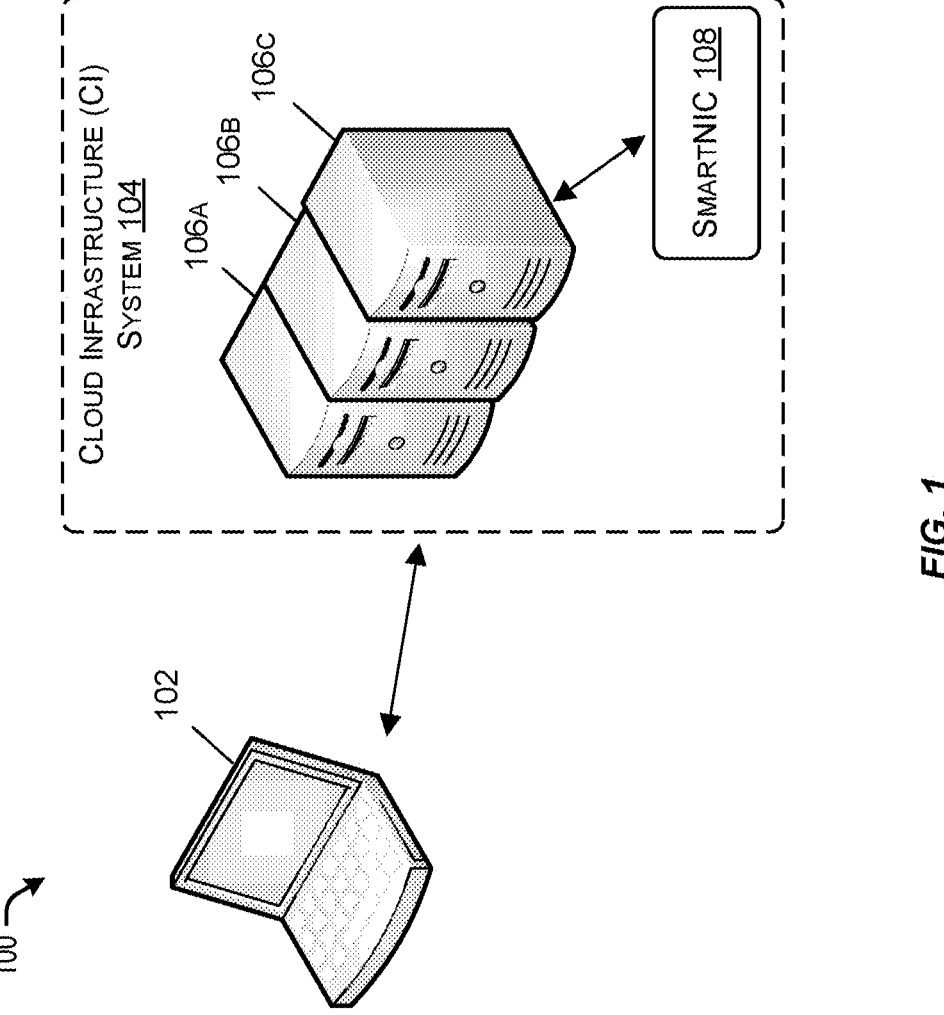
FIG. 1 is a block diagram of an exemplary network environment, according to at least one embodiment.

A unified extensible firmware interface (UEFI) on a computing device can include a security feature known as Secure Boot. Secure Boot can establish a trust relationship between the UEFI BIOS and the software it launches (e.g., bootloader, drivers, and utilities). Once Secure Boot is enabled, only software and firmware signed with the required keys may be allowed to execute. As errors and bugs are detected, trust privileges for undesirable software can be revoked. If a new application requests to boot up on a computing device, Secure Boot can retrieve secure boot metadata from the computing device's firmware (non-volatile memory). Secure Boot then can compare the application's secure boot metadata with the stored secure boot metadata to determine whether the application should be allowed to execute. As part of the comparison, Secure Boot can compare the application's secure boot metadata with stored secure boot metadata of allowed applications and disallowed applications. As time passes, developers can design secure boot metadata with longer bit lengths as an added security feature. This, in turn, may require the firmware to expend additional bits to store the longer secure boot metadata, including the secure boot metadata for the allowed applications and disallowed applications.

For computing devices connected in a cloud computing environment, as described by embodiments herein, rather than storing secure boot metadata in the device's firmware, the metadata can be stored in one or more storage locations in a cloud computing infrastructure system. Access to the secure boot metadata is managed by a metadata management service's application executing on a smart network information card (SmartNIC). The SmartNIC can be connected to the computing device that is a part of the cloud computing infrastructure.

By offloading storage of the secure boot metadata from the computing device's firmware to network storage, the firmware had additional memory to dedicate to other functionality. Furthermore, the computing device executing the firmware is relieved from updating the secure metadata. Updating a computing device's firmware is a time-consuming activity and storing the secure boot metadata in cloud computing storage further eases this burden.

When a customer requests a new host instance, a control plane of the cloud computing environment can provision a boot partition in network storage. The boot partition is a secure memory location that holds a boot loader for creating the new host instance. The computing device can further receive a pre-boot execution environment executable from a SmartNIC. The computing device then verifies the pre-boot execution environment executable based on a cryptographic key received from the cloud computing environment's servicer (e.g., a key received from Oracle). The computing device further receives the boot loader from the boot partition. The computing device then verifies the boot loader using secure boot metadata received from the SmartNIC. Once verified, the computing device creates the new instance requested by the customer.

Referring to FIG. 1, a block diagram of an exemplary network environment 100 according to one or more embodiments is shown. The network environment 100 is operable to permit data communication between devices within the network environment 100 using one or more wired or wireless networks. As illustrated in FIG. 1, the network environment 100 includes a console 102 and a cloud infrastructure (CI) system 104 (including corresponding computing devices 106*a-c*). At least one computing device 106*c* can be in operable communication with a SmartNIC 108.

The console 102 can include a general-purpose personal computer, including, by way of example, a personal computer and/or a laptop computer with an operating system that is operable to communicate with the CI system 104. The console 102 is operable to instruct the computing device 106*c* to retrieve a pre-boot execution environment executable from the CI system 104. The computing device 106*c* can verify the pre-boot execution environment executable using a cryptography key from a cloud computing environment provider. The computing device 106*c* can further retrieve a boot loader and verify the boot loader using secure boot metadata retrieved from a SmartNIC 108. The Smart-NIC 108 is a programmable accelerator that receives offloaded tasks from one or more computing device (e.g., computing device 106*a-c*) to make networking, security, and storage more efficient and flexible.

The CI system 104 can include one or more interconnected computing devices implementing one or more cloud computing applications or services. For example, the CI system 104 can store and provide access to database data (e.g., via a query of the database). The computing devices 106*a-c* included in the CI system 104 can be in one or more data center environments (e.g., colocation centers).

As illustrated in FIG. 1, a computing device 106*c* can implement the SmartNIC 110. The SmartNIC 110 can be connected to the computing device 106*c* in the CI system 104. The SmartNIC 110 can be configured to receive secure boot metadata from a metadata management service and provide the metadata to a trusted platform module (TPM) of the computing device 106*c* (i.e., cloud computing node). The computing device 106*c* can include a computing device (e.g., a server or series of computing devices) of the CI system 104. For example, the computing device 106*c* can include a server that is connected to the CI system 104 at a data center environment (e.g., a colocation center). The computing device 106c can be configured to perform various processing tasks to implement one or more application services. As described herein, the computing device 106c can receive a pre-boot execution environment executable from the SmartNIC 108. The computing device 106 can verify and execute the pre-boot execution environment executable. The computing device 106c can further request a bootloader for a secure boot partition. The computing device 106c can request the secure boot metadata from the SmartNIC 110. The computing device can verify the boot loader using the secure boot metadata. The computing device 106c can execute the boot loader to initiate an instance for a CI system customer.

Figure 2:
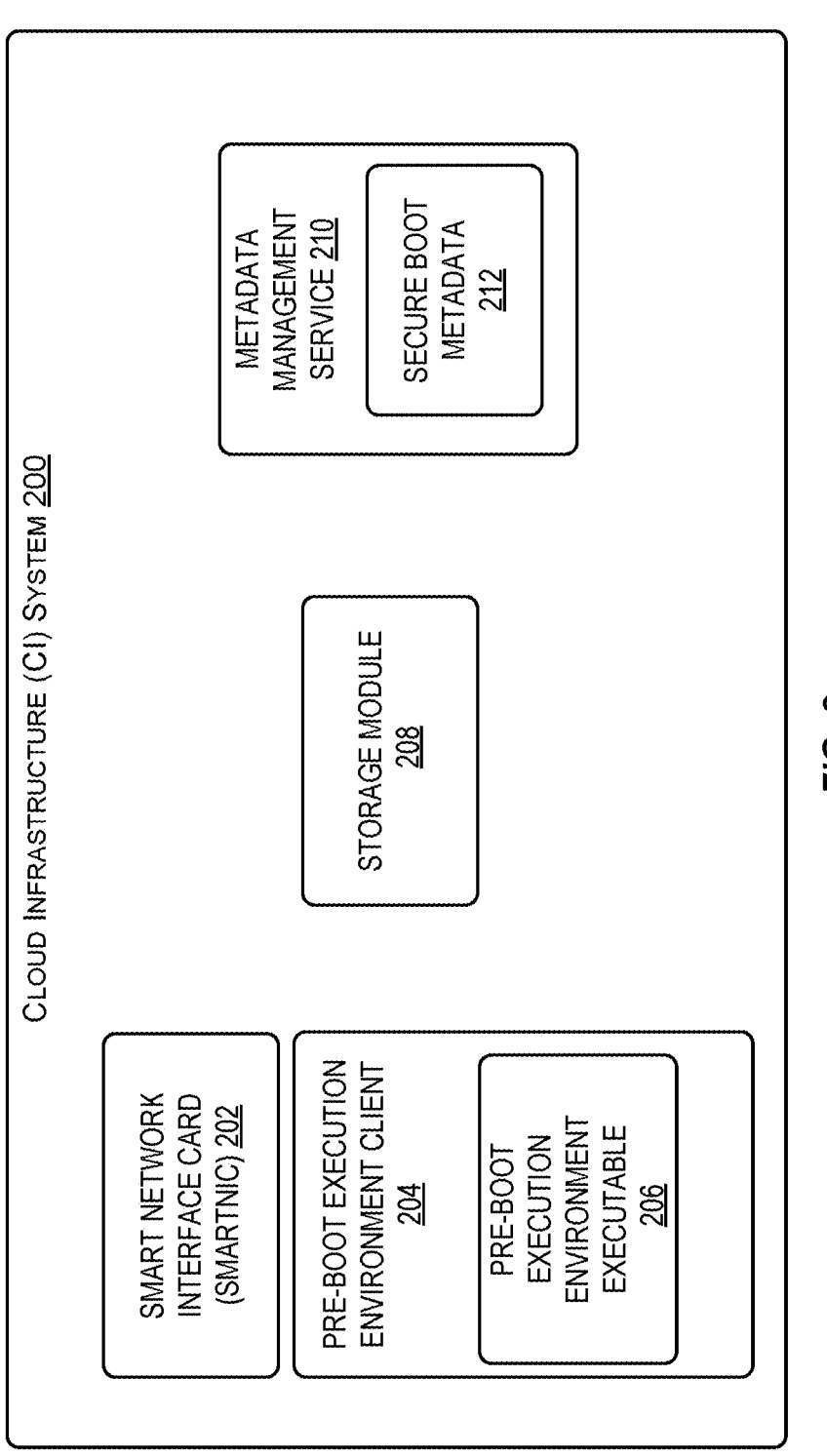
FIG. 2 is a block diagram of an exemplary cloud computing infrastructure system, according to at least one embodiment.

Referring to FIG. 2, a block diagram of an example CI system 200 according to one or more embodiments is shown. As illustrated, the CI system 200 includes one or more interconnected computing devices (e.g., computing devices 106a-c) implementing various applications/services. The CI system 200 can include one or more central computing devices implementing core functionality of the CI system 200, including computing device 106c maintaining the SmartNIC 202. The SmartNIC 202 can interact with the computing device 106c to return secure boot metadata from a metadata management service.

The CI system 200 can include a pre-boot execution environment client 204 (e.g., iPXE). The SmartNIC 202 manages execution of the pre-boot execution environment client 204. The pre-boot execution environment client 204 is can further include a pre-boot execution environment executable 206 configured to provide the computing device 106c with a pre-boot execution environment to execute without an installed operating system (OS). For example, the computing device 106c can communicate with iPXE client software executing on the SmartNIC 202 and receive an iPXE environment executable (iPXE.efi). The iPXE environment includes a trivial file transfer protocol (TFTP) and a dynamic host configuration protocol (DHCP) for enabling network communication between the computing device 106c and the rest of the CI system 200.

The CI system 200 can include a storage module 208. The storage module 208 can store various data types (e.g., mounted boot partition) across devices in the CI system 200. The CI system further includes a metadata management service 210. The metadata management maintains secure boot metadata 212. The secure boot metadata 212 includes verification data, including cryptographic keys for verifying a boot loader. In some instances, the control plane of the CI system 200 can request the secure boot metadata 210 from the metadata management service 210. The request can be made in response to creating a boot partition. The metadata management service 210 retrieves the secure boot metadata 212 and transmits the metadata to the SmartNIC 202. The SmartNIC 202, in turn, transmits secure boot metadata 212 to the computing device 106c.

Figure 3:
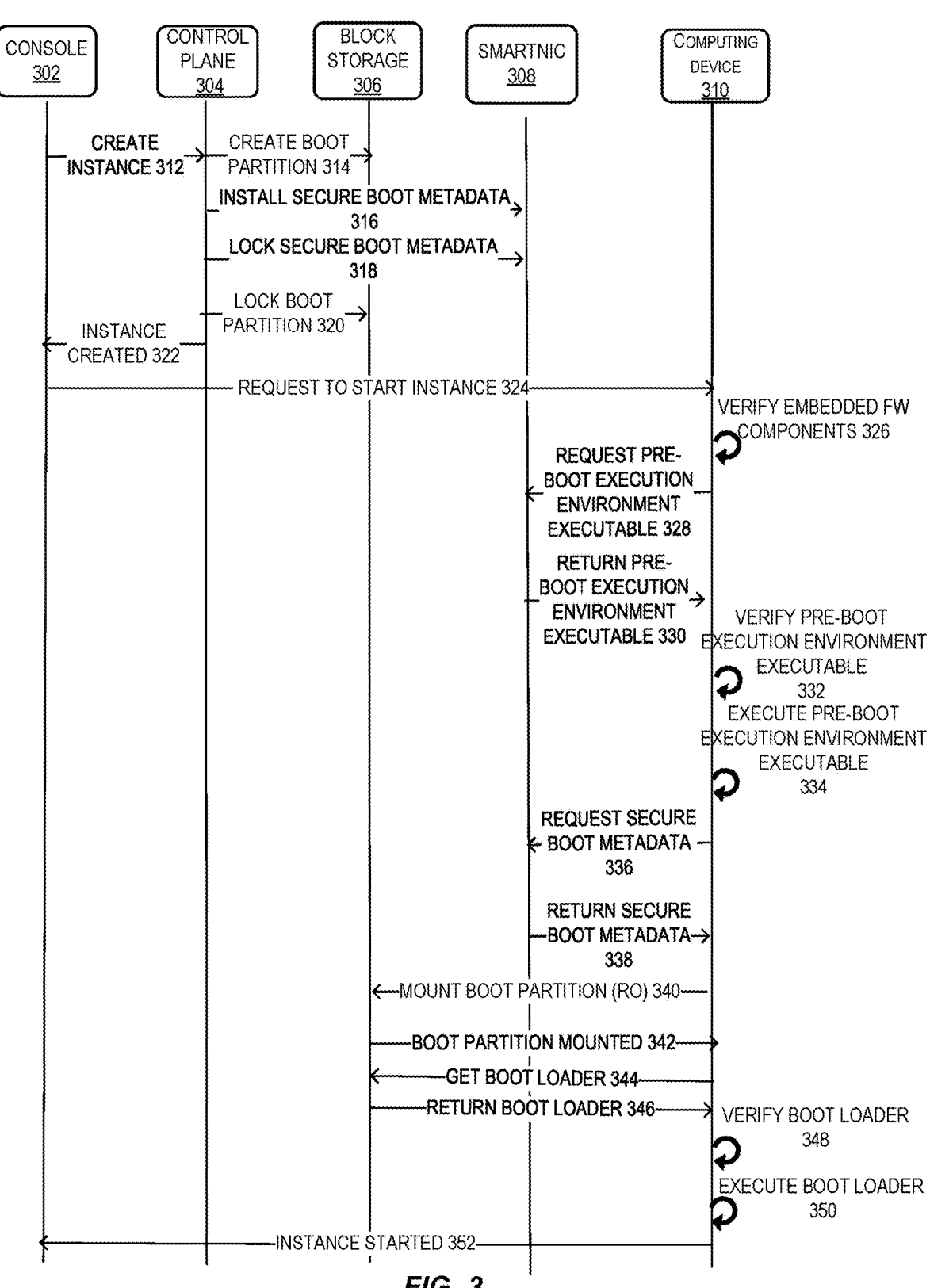
FIG. 3. is a signaling process illustrating an exemplary secure boot partition, according to at least one embodiment.

Referring to FIG. 3, a signaling process 300 illustrating an exemplary secure boot partition process according to one or more embodiments is shown. As shown in FIG. 3, a console 302, a SmartNIC 308, and a computing device 310 of a CI system can interact with each other. While the operations of processes 300, 400, and 500 are described as being performed by generic computers, it should be understood that any suitable device (e.g., a user device, a server device) may be used to perform one or more operations of these processes. Processes 300, 400, and 500 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 312, the console 302 can send a request to create a new instance to a CI system. At 314, the control plane 304 of the CI system intercepts the request, and in response to the requests, sends instructions to create a boot partition in the block storage 306 of a CI system. The boot partition is a volume for storing files used to start a computing process (e.g., a bootloader).

In further response to the request, at 316, the control plane 304 determines the appropriate secure boot meta required for the instance that the console 302 has requested. The control plane 304 then send instructions to a metadata management service to transmit secure boot metadata to the SmartNIC 308. The secure boot metadata includes cryptographic keys (e.g., a platform key (PK), key exchange key (KEK)), a key database (db), and a forbidden key database (dbx), and other data appropriate for authentication. In conventional systems, the variables are stored in a computing device's firmware. However, as described above the space available in non-volatile memory becomes increasingly scarce as objects include a greater number of bits. As such the secure boot metadata is stored in the CI system's storage, for example, in block storage. The storage capacity in a network is orders of magnitude greater than the storage capacity of a computing device. This advantageously relieves the computing device's memory of the obligation to store the variables.

At 318, the SmartNIC 308 locks the received secure boot metadata. Various methods can be applied to lock the received secure metadata. Locking the secure boot metadata prevents another entity from manipulating the data. For example, one method would be converting the secure boot metadata to read-only.

In some embodiments, the control plane 304 transmits instructions to lock the boot partition at 320. Various methods can be applied to lock the boot partition. For example, one method would be converting the boot partition to read only.

At 322, the control plane 304 transmits a message to the console that the instance has been created. At 324, the console can send a request to start the instance to the computing device 310. The request includes instructions for the computing device 310 to connect to the SmartNIC 308.

At 326, the SmartNIC 308 verifies the embedded firmware components of the computing device 310. For example, the SmartNIC 308 verifies a signature provided by the computing device 310 via a cryptographic key provided by the CI system.

At 328, the computing device 310 can send a request for a pre-boot execution environment executable to the SmartNIC 308. The request can be directed to pre-boot execution environment client (e.g., iPXE client software) executing on the SmartNIC 308.

At 330, the SmartNIC 308 can provide the pre-boot execution environment executable (e.g., iPXE.efi). The pre-boot execution environment executable, when executing, enables a computer to load an operating system (OS) over a network connection.

At 332, the computing device 310 verifies the pre-boot execution environment executable provided by the Smart-NIC 308 prior to executing the pre-boot environment. For example, the computing device 310 verifies a signature provided by the iPXE client executing on the SmartNIC 308 via a cryptographic key.

At 334, the computing device executes the pre-boot environment executable. The computing device 310 can execute the pre-boot execution environment. Executing the pre-boot execution environment executable can include executing a boot procedure, initiating services/applications, components, etc.

At 336, the computing device 310 requests the secure boot metadata. In some embodiments, the computing device 310 broadcasts the request for secure boot metadata to the CI system. However, only the SmartNIC 308 is configured to respond to the broadcast, and therefore only the SmartNIC 310 responds to the request. At 338, the SmartNIC 308 returns the secure boot metadata to the computing device 310.

At 340, the computing device 310 mounts the boot partition at a block storage 306. At 342, the block storage 306 transmits a message to the computing device 310 that the boot partition has been mounted. At 342, the block storage 306 sends a message to the computing device 310 that the boot partition has been mounted.

At 344, in response to receiving the message that the boot partition has been mounted, the computing device 310 requests an image operating system (OS) including a boot-loader from the boot partition in the block storage 306. At 346, the block storage 306 returned the OS image to the computing device 310.

At 348, the computing device 310 performs a verification process for the boot loader using the secure boot metadata. If the computing device 310 cannot be verified based on the secure boot metadata, an error message is generated. If the computing device 310 verifies the boot loader based on the secure boot metadata, the computing device 310 executes the boot loader at 350. At 352, the computing device 310 starts the instance requested by the console 302.

Figure 4:
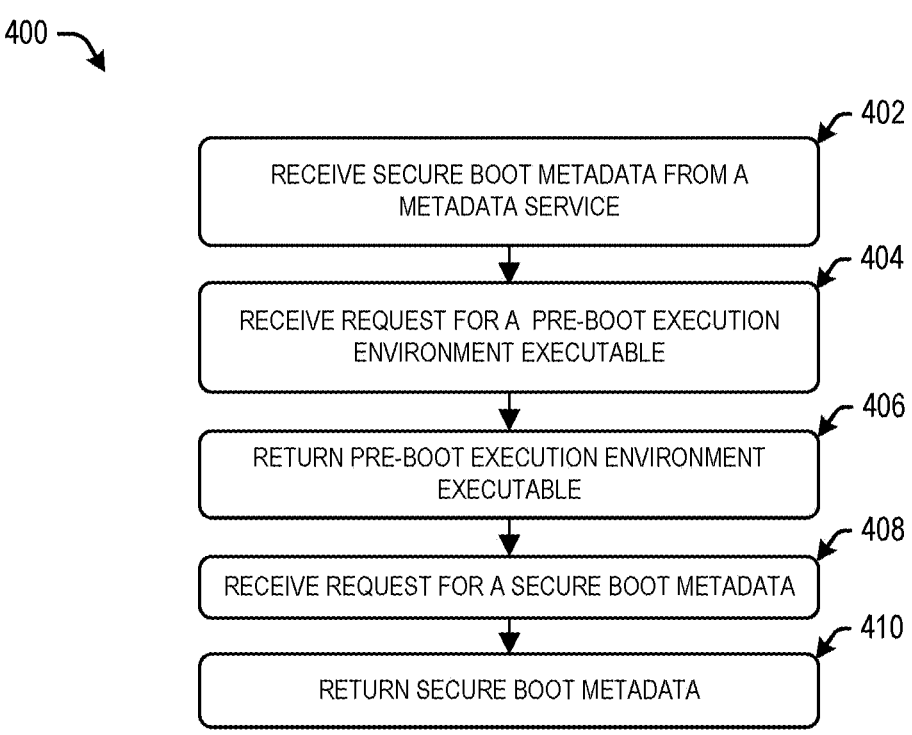
FIG. 4. is a block diagram illustrating an exemplary method performed by a smart network interface card (Smart-NIC) for performing a secure boot partition process, according to at least one embodiment.

Referring to FIG. 4, a block diagram illustrating an example method 400 performed by a SmartNIC for performing a secure boot partition is shown in accordance with one or more embodiments. At 402, the SmartNIC can receive secure boot metadata from a metadata management service. The SmartNIC is in operable communication with a computing device of a network, for example, in a cloud computing environment. The secure boot metadata includes variables includes cryptographic keys (e.g., a platform key (PK), key exchange key (KEK)), a key database (db), and a forbidden key database (dbx), and other data appropriate for authentication. The metadata management service executes on the SmartNIC and retrieves the secure boot metadata from network's storage. In conventional systems, the secure boot metadata is stored locally on a computing device by the computing device's firmware. As keys and other authentication data increase in size, the storage capacity of the firmware becomes increasingly strained. By storing the secure boot metadata in the network's storage, the demand on the computing device's firmware storage is relieved.

At 404, the SmartNIC receives a request for a pre-boot execution environment executable from the computing device. In some embodiments, a pre-boot execution environment client software (e.g., iPXE) holds the pre-boot execution environment executable. In these embodiments, the request from the computing device is directed towards the pre-boot execution environment client software.

At 406, the SmartNIC returns the pre-boot execution environment pre-boot execution environment (e.g., iPXE.efi) to the computing device. The pre-boot execution environment pre-boot execution environment includes a trivial file transfer protocol (TFTP) and a dynamic host configuration protocol (DHCP) for enabling network communication.

At 408, the SmartNIC receives a request for the secure boot metadata from the pre-boot execution environment. In conventional systems, the secure boot metadata would be stored in the computing device's firmware. According to embodiments, the pre-boot execution environment is configured to retrieve the secure boot metadata from the Smart-NIC rather than from the firmware. At 410, the SmartNIC returns the secure boot metadata.

Referring to FIG. 5, a block diagram illustrating an example method 500 performed by a computing device for performing a secure boot partition is shown in accordance with one or more embodiments. At 502, the computing device checks the embedded components of the firmware executing on the computing device. The computing device being a computing device of a network of computing devices located at a data center (e.g., a colocation), for example, as part of a CI system.

At 504, the computing device requests a pre-boot execution environment executable from a SmartNIC. In some embodiments, the SmartNIC is executing a pre-boot execution environment client (i.e., iPXE). In these embodiments, the computing device executes a TFTP request to the pre-boot execution environment software client for the pre-boot execution environment executable.

At 506, the computing device receives a pre-boot execution environment executable from the SmartNIC. The pre-boot execution environment executable includes a trivial file transfer protocol (TFTP) and a dynamic host configuration protocol (DHCP) for enabling network communication.

At 508, the computing device verifies the pre-boot execution environment executable. In some embodiments, verification is performed by receiving a key from the CI system. The key is the same key used to verify each instance of the pre-boot execution environments (e.g., all iPXE pre-boot execution environments). This reduces the necessity to update the secure boot metadata. The key only signs the pre-boot execution environment executable and is the same across all compute nodes executing the pre-boot execution environment executable. Therefore, the likelihood that the secure boot metadata in the computing device's firmware needs updating after provision is diminished. If a vulnerability in the pre-boot execution environment executable is detected, only the key provided by the CI system needs to be revoked and replaced. By contrast, the conventional systems require the variables need to be updated locally at the computing device's firmware any time a vulnerability is discovered. These updates are time-consuming and large, thereby straining a computing device's processing capability during the updates.

If the computing device verifies the pre-boot execution environment executable is verified, the computing device executes the pre-boot execution environment executable at 510. If the computing device cannot verify the pre-boot execution environment executable, an error message is generated.

At 512, the pre-boot execution environment executing on the computing device sends a request to the SmartNIC for the secure boot metadata. In conventional systems, the pre-boot execution environment is configured to request secure boot metadata from the computing device's firmware. In embodiments of the pre-boot execution environment as described herein, the pre-boot execution environment is configured to request secure boot metadata from the network (e.g., the CI system) via the SmartNIC. At 514, the Smart-NIC returns the secure boot metadata to the pre-boot execution environment.

In response to receiving the secure boot metadata, the pre-boot execution environment mounts the boot partition at a block storage of the CI system at 516. At 518, the pre-boot execution environment sends a request to the block storage for an image of the operating system (OS), which includes a boot loader. At 520, the pre-boot execution environment receives the image of the OS from the block storage.

At 522, the pre-boot execution environment verifies the boot loader image using the secure metadata. The pre-boot execution environment verifies the boot loader according to a policy outlined included in the secure boot metadata. The pre-boot execution environment loads the boot loader image and then determines the images signatures.

The following describes a procedure for each signature of the boot loader image. The pre-boot execution environment compares each signature to signatures in a forbidden key database (dbx). The forbidden key database (dbx) is included in the secure boot metadata. If an image signature is found in the forbidden key database, the verification fails.

If the signature is not found in the forbidden key database (dbx), the pre-boot execution environment compares the signature to signatures found in a key database (db). The key database (db) is also included in the secure boot metadata.

If the signature is found in the key database (db), the pre-boot execution environment compares the image's hash to a list of hashes found in the forbidden key database (dbx). If the image hash is found in the forbidden key database (dbx), the verification fails. If the image's hash is found in the forbidden key database (dbx), the verification fails. If the image hash is not found in the forbidden key database (dbx), the verification passes.

If the signature is not found in the key database (db), the pre-boot execution environment compares the image's hash to hashes found in the forbidden key database (dbx). If the image hash is found in the forbidden key database (dbx), the verification fails. If the image hash is not found in the forbidden key database (dbx), the pre-boot execution environment compares the image hash to images hashes found in the key database (db). If the image hash is found in the key database (db), the verification passes. If the image hash is not found in the key database (db), the verification fails.

If the pre-boot execution environment verifies the boot loader image, it executes the boot loader at 524. If the pre-boot execution environment does not verify the boot loader image, an error message is generated.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing, and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need to be set up. In some instances, the provisioning can be done manually, a provisioning tool may be utilized to provision the resources, and/or deployment tools may be utilized to deploy the code once the infrastructure is provisioned.

Figure 6:
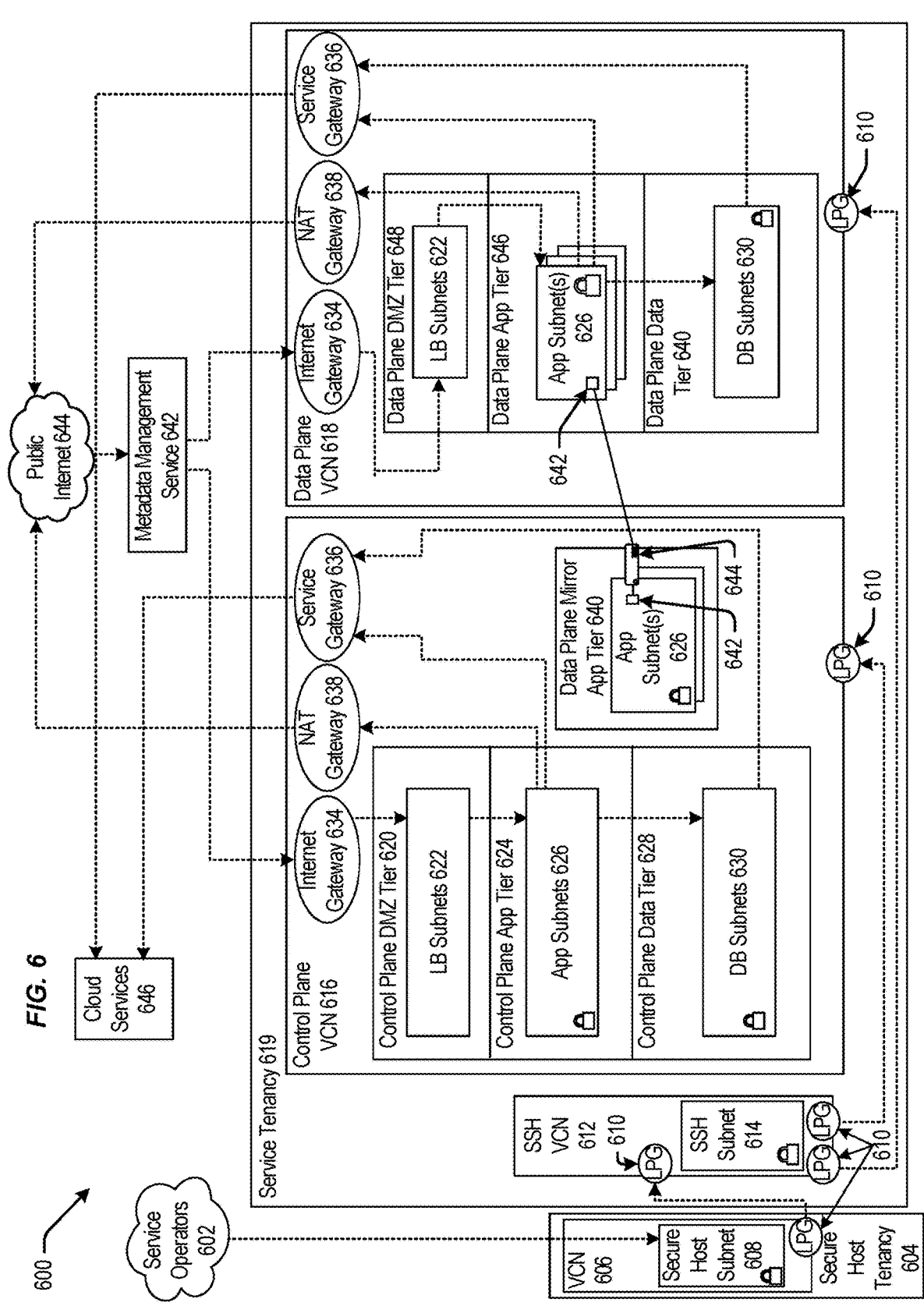
FIG. 6 is a block diagram illustrating a pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB)

subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
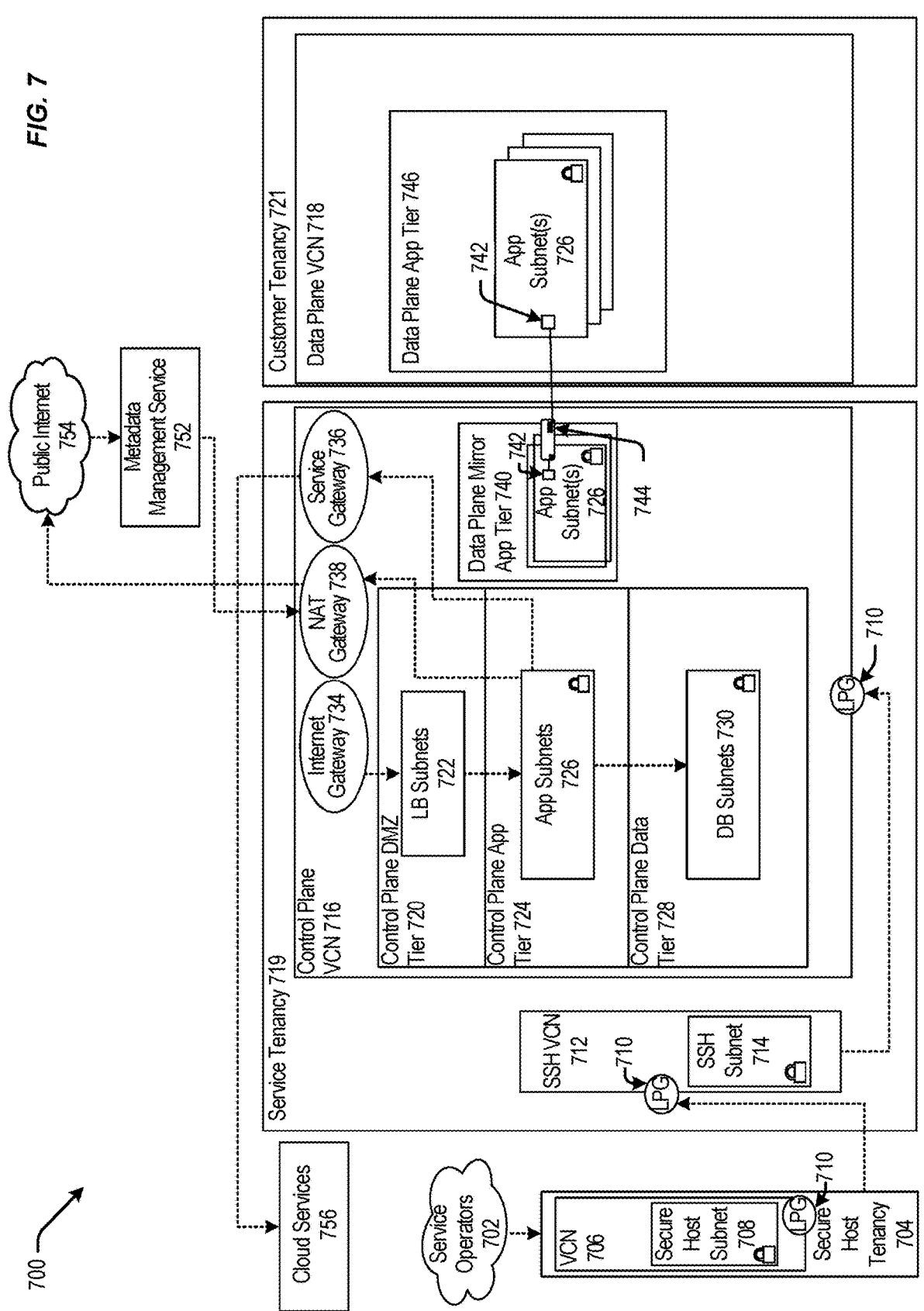
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 776 can include a local peering gateway (LPG) 710 (e.g., the LPG 610 of FIG. 6) that can be communicatively coupled to a secure shell (SSH) VCN 712 (e.g., the SSH VCN 612 of FIG. 1) via an LPG 710 contained in the SSH VCN 712. The SSH VCN 712 can include an SSH subnet 714 (e.g., the SSH subnet 714 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 124 of FIG. 1) that can include app subnet(s) 726 (e.g., app subnet(s) 626 of FIG. 6), a control plane data tier 728 (e.g., the control plane data tier 128 of FIG. 1) that can include database (DB) subnet(s) 730 (e.g., similar to DB subnet(s) 130 of FIG. 1). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642 of FIG. 6) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 746 of FIG. 7) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 221. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 1," may be located in Region 1 and in "Region 2." If a call to Deployment 1 is made by the service gateway 736 contained in the control plane VCN 716 located in Region 1, the call may be transmitted to Deployment 1 in Region 1. In this example, the control plane VCN 716, or Deployment 1 in Region 1, may not be communicatively coupled to, or otherwise in communication with, Deployment 1 in Region 2.

Figure 8:
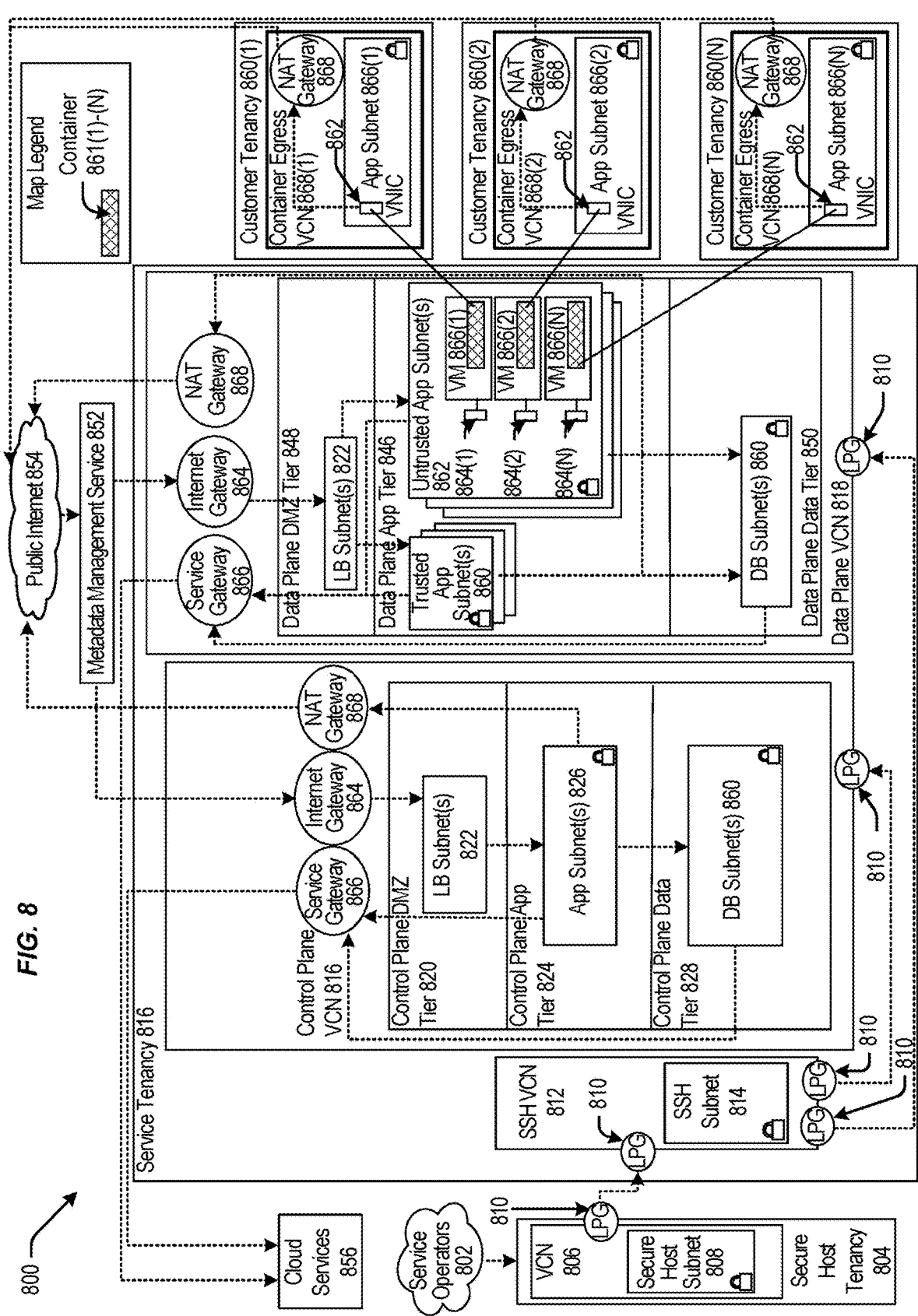
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 806 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 1) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCOs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6). The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
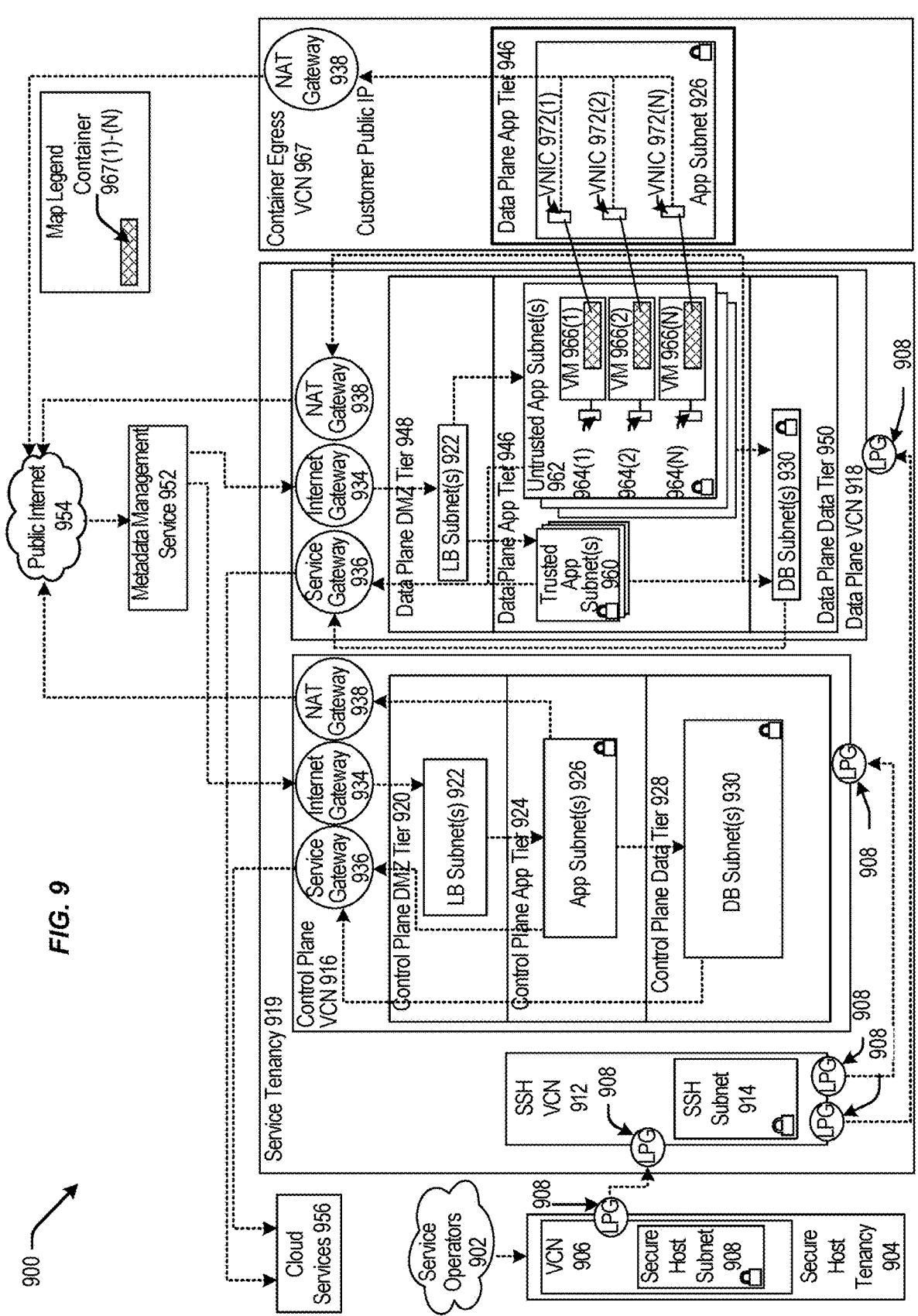
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 412. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 630 of FIG. 6). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway 636 of FIG. 6) and a network address translation (NAT) gateway 638 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967 (1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
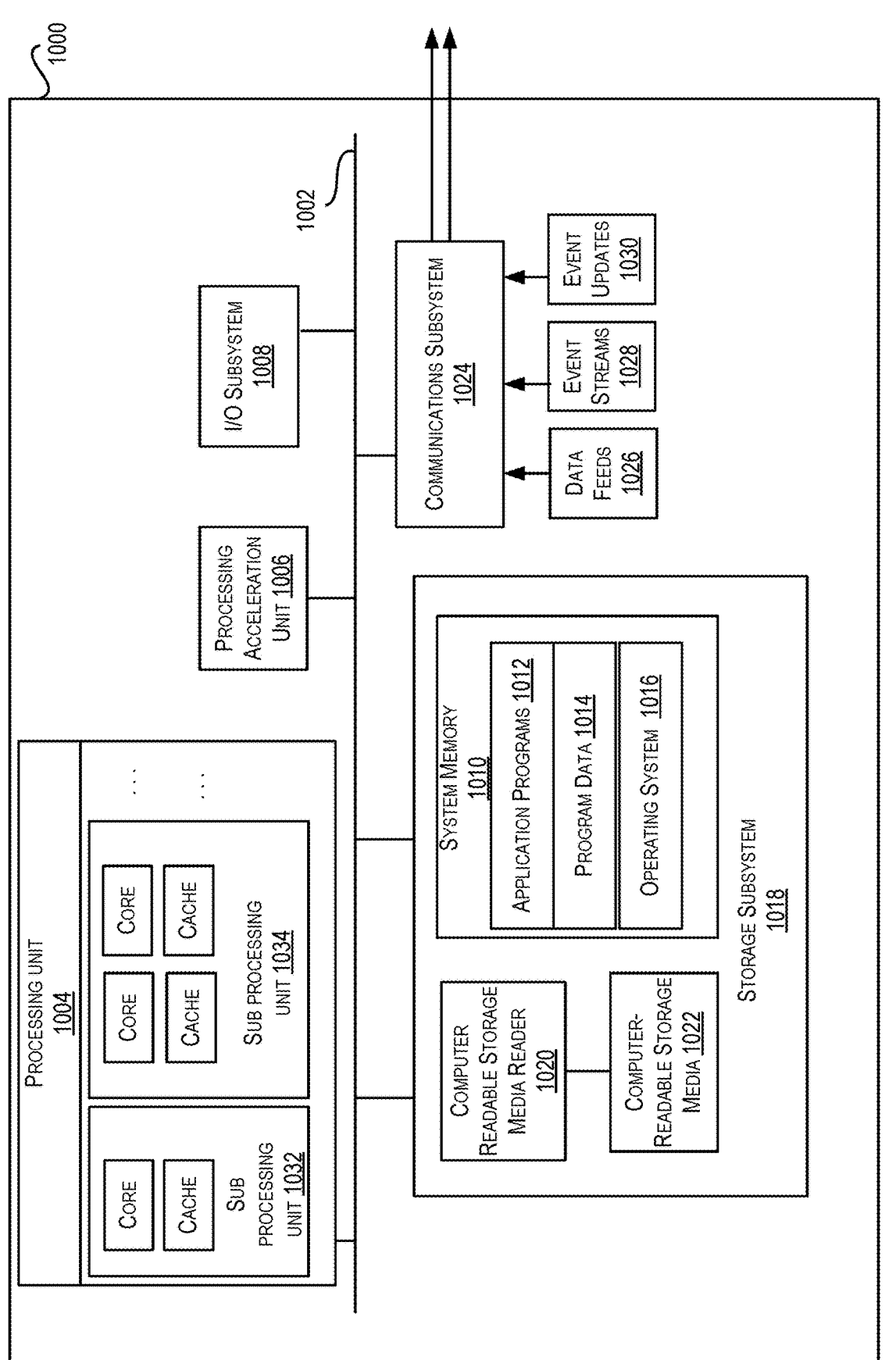
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, the method comprising:

maintaining a pre-boot execution environment executable on a smart network interface card associated with a cloud computing system for distribution to one or more new host instances;

while maintaining the pre-boot execution environment executable on the smart network interface card: receiving, by the cloud computing system from a first computing device, a request to initialize a new host instance;

responsive to receiving the request:
    selecting a second computing device for implementing the new host instance;
    instructing, by the cloud computing system, the second computing device of the cloud computing system to connect to the smart network interface card, associated with the cloud computing system, that is storing the pre-boot execution environment executable for distribution to one or more host instances;

receiving, by the cloud computing system via the smart network interface card, a request from the second computing device for the pre-boot execution environment executable; and causing, by the cloud computing system, transmission of the pre-boot execution environment executable from the smart network interface card to the second computing device of the cloud computing system, wherein the second computing device executes the pre-boot execution environment executable to load an operating system (OS) over a network on the second computing device.

2. The computer-implemented method of claim 1, further comprising:

responsive to receiving the request:
    creating, by the cloud computing system, a boot partition in a block storage associated with the cloud computing system, wherein the boot partition stores at least a boot loader; and instructing, by the cloud computing system, a metadata management service to transmit secure boot metadata for the new host instance to the smart network interface card associated with the cloud computing system.

3. The computer-implemented method of claim 2, wherein the smart network interface card stores the secure boot metadata, and wherein the second computing device obtains and verifies the boot loader from the boot partition based at least in part on the secure boot metadata obtained from the smart network interface card.

4. The computer-implemented method of claim 2, wherein the secure boot metadata includes one or more cryptographic keys, a key database, or a forbidden key database.

5. The computer-implemented method of claim 2, further comprising:

locking, by the cloud computing system, (i) the secure boot metadata at the smart network interface card and (ii) the boot partition in the block storage.

6. The computer-implemented method of claim 2, further comprising:

receiving, by the cloud computing system via the smart network interface card, a second request from the second computing device, the second request requesting the secure boot metadata; and providing, by the cloud computing system, the secure boot metadata to the computing device of the cloud computing system through the smart network interface card.

7. The computer-implemented method of claim 6, wherein the second request is generated upon execution of the pre-boot execution environment executable by the second computing device of the cloud computing system.

8. The computer-implemented method of claim 6, wherein the second request is broadcasted by the second computing device of the cloud computing system over the network, and wherein the smart network interface card is configured to listen and respond to the broadcast of the second request over the network.

9. The computer-implemented method of claim 6, further comprising:

determining, by the cloud computing system, that the boot partition in a block storage associated with the cloud computing system has been mounted by the second computing device of the cloud computing system, wherein the boot partition stores at least the boot loader; and transmitting, by the cloud computing system, a message to the second computing device of the cloud computing system that the boot partition has been mounted.

10. The computer-implemented method of claim 6, further comprising:

causing, by the cloud computing system, transmission of the pre-boot execution executable, that is maintained on the smart network interface card for distribution, to a plurality of computing devices selected for implementing respective new host instances.

11. A computing system, comprising a memory configured to store computer-executable instructions; and one or more processors configured to access the memory and execute the computer-executable instructions to at least:

maintaining a pre-boot execution environment executable on a smart network interface card associated with a cloud computing system for distribution to one or more new host instances;

while maintaining the pre-boot execution environment executable on the smart network interface card: receiving, by the cloud computing system from a first computing device, a request to initialize a new host instance;

responsive to receiving the request:

selecting a second computing device for implementing the new host instance;

instructing, by the cloud computing system, the second computing device of the cloud computing system to connect to the smart network interface card, associated with the cloud computing system, that is storing the pre-boot execution environment executable for distribution to one or more host instances;

receiving, by the cloud computing system via the smart network interface card, a request from the second computing device for the pre-boot execution environment executable; and causing, by the cloud computing system, transmission of the pre-boot execution environment executable from the smart network interface card to the second computing device of the cloud computing system, wherein the second computing device executes the pre-boot execution environment executable to load an operating system (OS) over a network on the second computing device.

12. The computing system of claim 11, wherein the one or more processors are configured to access the memory and execute the computer-executable instructions to at least:

responsive to receiving the request:

creating a boot partition in a block storage associated with the cloud computing system, wherein the boot partition stores at least a boot loader; and instructing a metadata management service to transmit secure boot metadata for the new host instance to the smart network interface card associated with the cloud computing system.

13. The computing system of claim 12, wherein the smart network interface card stores the secure boot metadata, and wherein the second computing device obtains and verifies the boot loader from the boot partition based at least in part on the secure boot metadata obtained from the smart network interface card.

14. The computing system of claim 12, wherein the secure boot metadata includes one or more cryptographic keys, a key database, or a forbidden key database.

15. The computing system of claim 12, wherein the one or more processors are configured to access the memory and execute the computer-executable instructions to at least:

locking (i) the secure boot metadata at the smart network interface card and (ii) the boot partition in the block storage.

16. A non-transitory computer-readable medium, storing computer-executable instructions that, when executed, cause one or more processors of a computing system to perform operations comprising:

maintaining a pre-boot execution environment executable on a smart network interface card associated with a cloud computing system for distribution to one or more new host instances;

while maintaining the pre-boot execution environment executable on the smart network interface card: receiving, by the cloud computing system from a first computing device, a request to initialize a new host instance;

responsive to receiving the request:

selecting a second computing device for implementing the new host instance;

instructing, by the cloud computing system, the second computing device of the cloud computing system to connect to the smart network interface card, associated with the cloud computing system, that is storing the pre-boot execution environment executable for distribution to one or more host instances;

receiving, by the cloud computing system via the smart network interface card, a request from the second computing device for the pre-boot execution environment executable; and causing, by the cloud computing system, transmission of the pre-boot execution environment executable from the smart network interface card to the second computing device of the cloud computing system, wherein the second computing device executes the pre-boot execution environment executable to load an operating system (OS) over a network on the second computing device.

17. The non-transitory computer-readable medium of claim 16, wherein the one or more processors perform operations comprising:

responsive to receiving the request:

creating a boot partition in a block storage associated with the cloud computing system, wherein the boot partition stores at least a boot loader; and instructing a metadata management service to transmit secure boot metadata for the new host instance to the smart network interface card associated with the cloud computing system.

18. The non-transitory computer-readable medium of claim 17, wherein the smart network interface card stores the secure boot metadata, and wherein the second computing device obtains and verifies the boot loader from the boot partition based at least in part on the secure boot metadata obtained from the smart network interface card.

19. The non-transitory computer-readable medium of claim 17, wherein the secure boot metadata includes one or more cryptographic keys, a key database, or a forbidden key database.

20. The non-transitory computer-readable medium of claim 17, wherein the one or more processors perform operations comprising:

locking (i) the secure boot metadata at the smart network interface card and (ii) the boot partition in the block storage.

* * * * *